Aug. 31, 1965 H. J. WHITE 3,204,200

SELF-STARTING ASTABLE MULTIVIBRATOR MODULATOR

Filed Jan. 23, 1963

INVENTOR
H. J. WHITE
BY
J. P. Kearns
ATTORNEY

United States Patent Office 3,204,200

Patented Aug. 31, 1965

3,204,200

SELF-STARTING ASTABLE MULTIVIBRATOR MODULATOR

Herbert J. White, Freehold, N.J., assignor to Bell Telephone Laboratories, Incorporated, New York, N.Y., a corporation of New York Filed Jan. 23, 1963, Ser. No. 253,375
9 Claims. (Cl. 332—14)

This invention relates generally to astable multivibrators and particularly to circuits for operating such multivibrators as frequency-shift keyed modulators.

It has been found that favorable noise performance and propagation of digital data in binary form over telephone grade transmission facilities is enhanced if the two-level direct-current mark and space signals are first transformed into a wave that shifts between two predetermined frequencies. The usual telephone line is deficient in its ability to pass frequencies below about 250 cycles per second. Moreover, the delay distortion introduced by the telephone line increases sharply below about 1000 cycles per second and above about 2000 cycles per second. Between these two frequencies the delay distortion is reasonably linear. Therefore, if the two predetermined shift frequencies are chosen within this region, a data signal can be propagated with the least distortion.

One way of converting a two-level direct-current data signal into a corresponding two-frequency wave is through the use of free-running multivibrators. The multivibrator has the advantage that no tuned circuits are required. The usual multivibrator includes two amplifier components, such as electron tubes or transistors, each of which has its output circuit regeneratively back-coupled to the input circuit of the other component by means of a resistor-capacitor combination. The frequency of oscillation is determined principally by the time constant of the resistor-capacitor coupling. When both resistor-capacitor couplings are alike, a symmetrical square wave output is obtained. This output can be passed through a low-pass filter, if desired, for smoothing purposes before being applied to a telephone transmission line.

Keyed multivibrators are known in which the frequency of oscillation is controlled by changing the voltage level to which the capacitor in the resistor-capacitor time-constant circuit tends to charge during each quiescent period between switching instants. This type of keying has the disadvantage that phase discontinuities during the transitions between spacing and marking signals are caused to occur in the output wave which are a random function of the instant at which the keying takes place. These discontinuities may be as severe as a complete phase reversal at switching instants and may result in the generation of a wide band of spurious frequency components which render a data system using such a modulator more susceptible to noise disturbance than otherwise. As a further result the multivibrator tends to synchronize at the rate at which data is being sent. An additional disadvantage of voltage level keying control is that the maximum ratio of output frequencies is limited to the order of two-to-one.

It is an object of this invention to improve the keying performance of multivibrator modulators.

It is another object of this invention to forestall the production of phase discontinuities in shifting from one frequency to another in a frequency-shift modulator.

It is yet another object of this invention to render multivibrator modulators self-starting.

According to a principal feature of this invention, an astable multivibrator is modified to include in the charging path of the cross-coupling capacitors additional resistors which are capable of being switched in and out of the charging path under the control of a binary data signal. Unilaterally conducting diodes in series with these additional resistors are forward and back biased in accordance with the state of the data signal effectively to insert or remove the additional resistors. The time constant of the charging path therefore depends on the presence of these additional resistors. At the same time the reference voltage level to which the capacitors tend to charge is unaffected by the presence or absence of these additional resistors and phase discontinuities in the output wave at the switching instant are inherently suppressed.

According to another feature of this invention, a delayed action feedback circuit around one of the amplifier components responsive to the hanging up of that amplifier in one of its two output states operates to change the input state thereof and thereby forces the resumption of oscillation. This feedback arrangement operates to insure that the multivibrator cannot long remain in a condition where both amplifier elements assume the same output state. This condition is characteristically found in conventional multivibrators, for example, when voltage is initially applied to the multivibrator.

Among the advantages of the multvibrator of this invention are frequency stability, freedom from transient distortion, positive starting, simplicty and economy of circuitry and compactness.

The above and other objects, features and advantages of this invention will be appreciated from a consideration of the following detailed description and the drawing in which:

FIG. 1 is a detailed diagram of an astable multivibrator improved according to this invention to function as a frequency-shift keyed data modulator. The illustrative embodiment employs solid state active elements known as junction transistors and passive junction diodes.

Figures 1, 3:
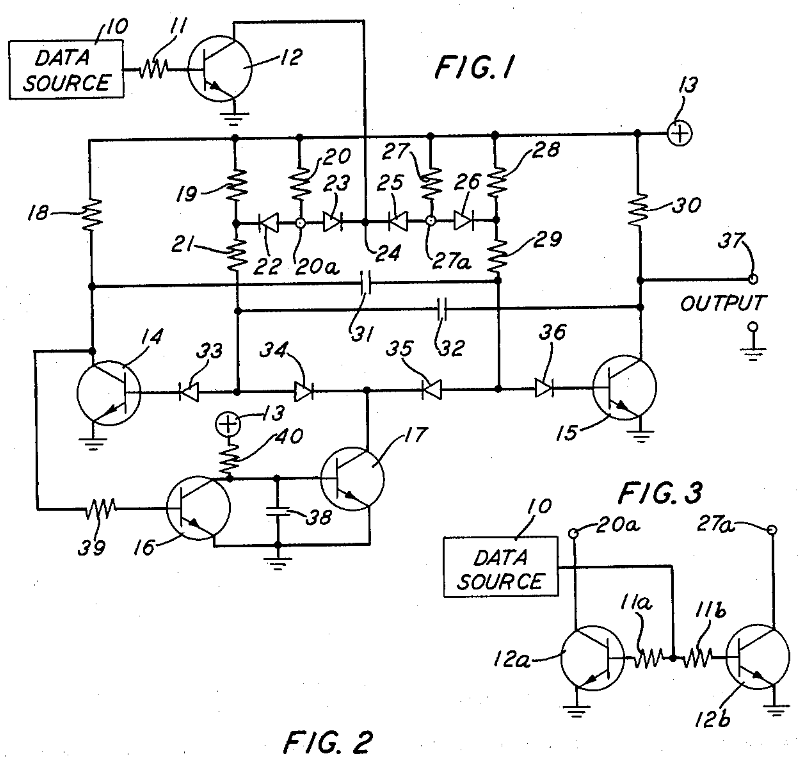
FIG. 1 is a circuit diagram of an illustrative embodiment of the multivibrator modulator of this invention using solid state components.
FIG. 3 is an alternative keying circuit for the multivibrator modulator of FIG. 1.

The multivibrator per se comprises NPN-type junction transistors 14 and 15; collector resistors 18 and 30; cross-coupling capacitors 31 and 32; base resistors 19, 21, 28 and 29; diodes 33 and 36; and power source 13. Except for the protection diodes 33 and 36, this is a well known configuration, which operates in a regenerative fashion to cut off and saturate the two transistors alternately. When transistor 14 cuts off, for example, the potential at its collector electrode rises rapidly toward the source potential maintained at point 13. The emitter electrode is returned to the negative side of the supply source, indicated by the ground symbol. The positive-going transition at the collector electrode of transistor 14 is coupled through capacitor 31 to the base region of transistor 15, which shortly saturates. The potential at the collector of transistor 15 falls toward the ground reference level maintained at its emitter electrode. This negative-going transition is coupled back to the base electrode of transistor 14 through capacitor 32 to drive this transistor farther into cut-off. Capacitor 32 then begins to charge toward the supply voltage through the collector-emitter path of transistor 15 and resistors 19 and 21. When the potential on the left-hand side of capacitor 32 exceeds the sum of the small base-emitter drop on transistor 14 and the forward drop across diode 33, transistor 14 snaps back to the saturated state and its collector potential falls to cut off transistor 15 again. In the meantime capacitor 31 has discharged through resistor 18 and the base-emitter circuit of transistor 15 to help maintain transistor 15 in saturation. The time constant of the discharge paths through the collector load resistors 18 and 30 is made much smaller than that of the charge paths through the base resistors 19, 21 and 28, 29. Accordingly, the switching times are determined by the magnitude of the base resistors.

The conventional astable multivibrator as described above and on page 602 of Millman and Taub's Pulse and Digital Circuits (McGraw-Hill Book Company, Inc., 1956) is converted into a frequency-shift modulator by the addition of auxiliary base resistors 20 and 27 and steering diodes 22, 23, 25 and 26. The purpose of the improvement is to enable the insertion of additional shunt resistance in the base circuits of the transistor amplifying elements to change the time constant of the charging paths of the cross-coupling capacitors, thereby changing the oscillation frequency of the multivibrator.

One end of each of resistors 20 and 27 is connected to the power source 13 at the common junction with base resistors 19 and 28. The other ends of resistors 20 and 27 are connected first to a common input point 24 through semiconductor diodes 23 and 25, respectively. Both diodes are poled for forward current flow toward the input point. The other ends of the resistors 20 and 27 are also connected respectively to the junction of base resistors 19 and 21 of transistor 14 through semiconductor diode 22 and to the junction of base resistors 28 and 29 through semiconductor diode 26. Both diodes 22 and 26 are poled for forward conduction toward the base resistor junction points.

Whether or not resistors 20 and 27 are effectively in shunt with base resistors 19 and 28 depends on the state of common input point 24. When point 24 is floating, that is, ungrounded, then diodes 23 and 25 are in their high resistance state and have no effect on the circuit. Therefore, diodes 22 and 26 are forward biased by current flowing from potential source 13 through resistors 20 and 27, respectively, both of which for this reason are chosen an order of magnitude smaller than the resistors 19 and 28. Resistors 20 and 27 then effectively shunt resistors 19 and 28 and thereby establish a relatively small time constant for the charging paths of capacitors 31 and 32. A relatively high frequency of oscillation is thereby determined for the multivibrator circuit.

When point 24, however, is grounded, forward biasing current from supply 13 is diverted from diodes 22 and 26 to diodes 23 and 25 and the former diodes 22 and 26 are effectively back-biased. Resistors 20 and 27 thus have no effect on the time constants of the charging paths of the cross-coupling capacitors. The new time constant is relatively larger than the time constant established with shunting resistors 20 and 27 in the circuit. Hence, the frequency of oscillation of the multivibrator is reduced.

The circuit associated with transistor 12 provides a convenient keyer to be connected to point 24 in the multivibrator described above and shown in FIG. 1. A data source, such as a computer, a business machine, a tape sender, or the like is represented by box 10. Marking ("1") and spacing ("0") data bits are conveniently indicated by positive and negative voltage levels in a known standard code. It has been explained above that common input point 24 is activated by a ground signal and remains quiescent under open circuit conditions. Therefore, transistor 12, in a grounded emitter configuration, forms an inverter circuit. Negative inputs on its base electrode cut off transistor 12 and positive inputs saturate it. Since the collector of transistor 12 is directly connected to common point 24 and positive marking bits saturate transistor 12, common point 24 is clamped to ground effectively to remove resistors 20 and 27 from the input circuit for marking bits. Negative spacing bits, on the other hand, cut off transistor 12 and common point 24 sees an open circuit. Resistors 20 and 27 are then inserted in parallel with resistors 19 and 28.

An alternative keying circuit is shown in FIG. 3. This circuit eliminates diodes 23 and 25 at the cost of adding one transistor. The junctions between resistor 20 and diode 22 and between resistor 27 and diode 26 are designated 20*a* and 27*a*, respectively. The circuit of FIG. 3 is connected to points 20*a* and 27*a* as shown in place of diodes 23 and 25, transistor 12 and resistor 11. The output of data source 10 is connected through resistors 11*a* and 11*b* to the base electrodes of junction transistors 12*a* and 12*b*, which are of the same type of transistor 12 of FIG. 1. Both emitter electrodes are grounded. The collector electrodes are connected directly to points 20*a* and 27*a* in FIG. 1 as indicated. Positive marking bits from data source 10 saturate both transistors 12*a* and 12*b*, thereby grounding points 20*a* and 27*a*. Diodes 22 and 26 are therefore back-biased and resistors 20 and 27 are effectively removed from the base circuits of transistors 14 and 15. The multivibrator oscillates at its low frequency. Negative spacing bits cut off transistors 12*a* and 12*b* and points 20*a* and 27*a* are left floating. Diodes 22 and 26 are forward biased and resistors 20 and 27 are again in the multivibrator circuit. The multivibrator then oscillates at its high frequency. The alternative keying circuit of FIG. 3 is clearly the functional equivalent of that of FIG. 1.

In the conventional multivibrator as previously mentioned it is possible for both active elements to go into clamp simultaneously when power is initially applied. Both active elements hang up because neither capacitor acquires a charge that can leak off and destroy the symmetry. Either the power must be turned off and reapplied, or one of the input electrodes of an active element must be grounded. The first solution may not be a positive one because the elements may hang up on the second trial. A feature of this invention is an auxiliary feedback circuit for insuring positive starting by grounding the input electrodes of the elements whenever one of the active elements remains in saturation for an indefinite period.

The positive starting auxiliary circuit comprises NPN junction transistor 16 and 17, resistors 39 and 40, capacitor 38, and junction diodes 34 and 35. The base electrode of transistor 16 is connected through isolating resistor 39 to the collector electrode of one of the multivibrator transistors, such as transistor 14. The collector electrode of transistor 16 is returned to positive potential source 13 through load resistor 40. Capacitor 38 is connected from the collector of transistor 16 to ground. The values of resistor 40 and capacitor 38 are chosen to achieve a time constant exceeding the period of the multivibrator. The collector of transistor 16 and the base of transistor 17 are directly coupled. The emitter electrodes of both transistors 16 and 17 are returned to ground reference, that is, the negative side of potential source 13. The collector of transistor 17 is connected through steering diodes 34 and 35 to the base electrodes of multivibrator transistors 14 and 15 through protection diodes 33 and 36, respectively.

The operation of the positive starting circuit is such as to keep capacitor 38 discharged as long as the multivibrator is oscillating. Thus, transistor 17 is normally in the cut-off state and its collector electrode is floating. Diodes 34 and 35 are effectively blocked and they have no effect on the multivibrator circuit. Transistor 16 is alternately turned on and off by the potential at the collector of transistor 14. When transistor 16 is on, its collector potential is at ground and there is no charge on capacitor 38. Therefore, transistor 17 is cut off. When transistor 16 is off, its collector potential tends to rise toward the supply voltage. Capacitor 38, however, cannot charge instantaneously. In normal multivibrator operation, transistor 16 does not remain off long enough for capacitor 38 to acquire sufficient charge to throw transistor 17 into saturation. However, should transistor 14 remain in saturation longer than the time constant of resistor 40 and capacitor 38, the potential across capacitor 38 will rise above the turn-on base potential of transistor 17. The collector of transistor 17 is then effectively at ground and diodes 34 and 35 are forward biased and the base currents to transistor 14 and 15 are shunted to ground. Transistor 14 cuts off and normal multivibrator action is effected. The auxiliary circuit is equally effective in restoring multivibrator action during normal running if for some reason, such as interruption of the power supply, the multivibrator transistors should hang up.

Figure 2:
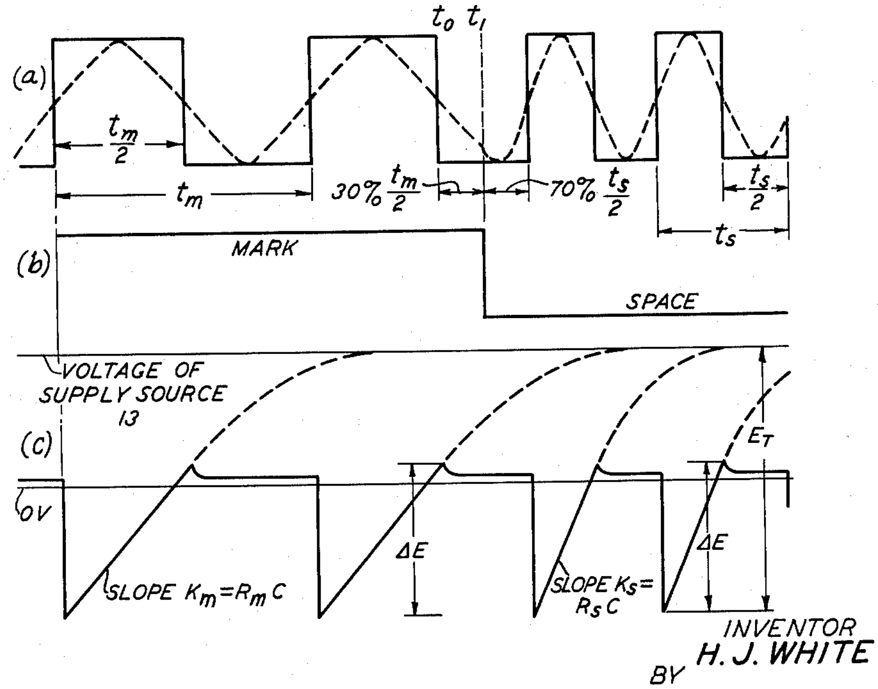
FIG. 2 is a waveform diagram illustrative of the manner in which smooth transitions during the frequency shift interval are achieved.

FIG. 2 depicts what happens in the multivibrator during some portion of a mark frequency cycle of the multivibrator. FIG. 2(*b*) shows the potential levels at point 24 of FIG. 1 during the transition from mark to space input. The space potential level is at or near ground and the mark level is well above ground. FIG. 2(*a*) shows the multivibrator output square waves (solid lines) as they appear at the collector of transistor 15. Output terminal 37 is shown connected to this collector electrode. The dashed sinusoidal wave is obtained by filtering the square wave output by means of a low-pass filter. In a practical circuit constructed according to the principles of this invention a mark frequency of 1150 cycles and a space frequency of 1850 cycles is obtained. Time $t_m$ is the period of the mark frequency and time $t_s$, the shorter period of the space frequency. If the mark to space frequency transition occurs, for example, at 30% of the half-period of the mark frequency as at time $t_1$, the cross-coupling capacitors are charged to a level which is equivalent to 70% of the time of one-half the space frequency period. No abrupt transition occurs in the output square wave. The fundamental waves of the two multivibrator frequencies are in phase when the transition occurs and sudden phase reversals are not possible. This phase synchronization remains true regardless of the time of occurrence of the data transition and whether the transition is from mark to space or space to mark. This is so because the data transition occasions no change in the potential levels between which the cross-coupling capacitors are charging and discharging in contrast to prior art circuits. Only the time constant of the charging paths and hence the slopes of the charging curves are changed.

It can readily be shown that the ratio of the period of either the mark or space frequency to the time constant required to effect it is a common constant. Since the voltage toward which the capacitor charges in each instance is the same, and also the difference in voltage traversed by the actual capacitor charge in each instance is the same, the only characteristic that changes is the slope of the charging wave as shown in FIG. 2(*c*).

The output frequencies of the multivibrators are $$f_m=\frac{1}{t_m} \qquad (1)$$

and $$f_s=\frac{1}{t_s} \qquad (2)$$

The time constants required to obtain these frequencies are $$k_m=R_mC \qquad (3)$$

and $$k_s=R_sC \qquad (4)$$

where $k_m$ and $k_s$ are constants, $R_m$ and $R_s$ are the resistances of the charging paths for capacitors 31 and 32, and C is the capacitance of the cross-coupling capacitors 31 and 32.

The equations for the charging paths are in the well known exponential form and are apparent from FIG. 2(*c*), as follows:

$$\Delta E=E_T(1-e^{-t_m/k_m}) \qquad (5)$$

$$\Delta E=E_T(1-e^{-t_s/k_s}) \qquad (6)$$

It is apparent from Equations 5 and 6 that $$\frac{t_m}{k_m}=\frac{t_s}{k_s}=a \qquad (7)$$

where $a$ is a constant.

With the ratio $a$ determined from Equation 7 to be constant at both the mark and space frequencies, it follows that with $\Delta E$ and $E_T$ remaining fixed in Equation 5 and 6 any transition between the two frequencies must be effected in such a way as to maintain $a$ constant. Thus there is always a smooth transition regardless of whether it is from mark to space or space to mark.

A buffer amplifier and a bandpass filter (not shown) are conveniently connected to the multivibrator output at point 37 to isolate the multivibrator from line disturbances and to smooth the square wave output into sinusoidal form. In order to maintain symmetry in the output wave, the load connected to point 37 should be equivalent in value to that of resistor 39.

In a practical circuit constructed according to the principles of this invention the following component values were used to generate a mark frequency of 1150 cycles and a space frequency of 1850 cycles.

| | |
|---|---|
| All diodes | Silicon type 1N456. |
| All transistors | NPN Silicon type 2N333. |
| Resistors: | |
| **11**, **11*a***, **11*b*** | 4,700 ohms. |
| **18**, **30** | 2,600 ohms. |
| **19**, **28** | 16,000 ohms. |
| **20**, **27** | 3,500 ohms. |
| **21**, **29** | 18,000 ohms. |
| **39** | 13,000 ohms. |
| **40** | 75,000 ohms. |
| Capacitors: | |
| **31**, **32** | 0.2 mf. |
| **38** | 0.55 mf. |
| Power supply **13** | +12.0 volts. |

The effects of temperature on this circuit over a 0 to 60° C. range were less than 1.0% in frequency change and within ±0.1 decibel in output power level. A ten percent change in power supply voltage produced less than 0.5% change in frequency and about 1.0 decibel in output power level.

It is apparent that the principles of this invention are applicable to a multivibrator modulator using PNP type transistors. In this case the negative supply voltage terminal is used at point 13 and all diodes are reversed in polarity.

While the principles of this invention have been set forth in terms of a specific embodiment, they are not to be regarded as limited in any way to this particular embodiment but are to be interpreted broadly within the scope of the appended claims. For example, it will be readily apparent to one skilled in the art that additional resistors 20 and 27 can be paralleled with resistors 19 and 28 under the control of additional steering diodes similar to diodes 23 and 25 when connected to the junctions of resistors 19–21 and 28–29. Each pair of additional resistors can be keyed by additional independent data sources to achieve multifrequency parallel data transmission. In such a case there could be generated a unique output frequency for each data permutation, for example $2^n$ frequencies for $n$ data sources. The advantage of output phase continuity and self-starting would continue to be realized in a multifrequency system constructed according to the principles of this invention.

What is claimed is:

1. A frequency-shift modulator comprising
a two-stage transistor multivibrator,
each stage of said multivibrator having an input and an output circuit and being in a conducting condition while the other stage is in a nonconducting condition,
a capacitor cross-coupling the input circuit of each multivibrator stage to the output circuit of the other, a pair of resistors in the input circuit only of each multi vibrator stage, a common junction for one end of all of each pair of resistors, a connection for one resistor of each said pair of resistors in common to one of said capacitors and to the input circuit of one of said transistors, a diode connecting the other ends of the resistors of each said pair and placing the resistors of each pair effectively in parallel when forward biased and effectively removing from the circuit one resistor of each said pair when reverse biased, and means for forward and reverse biasing said diodes in accordance with the state of a binary encoded intelligence signal.

2. In combination with an astable multivibrator including a pair of translating devices each having input and output electrodes, a capacitor cross-coupling the respective input and output electrodes, a supply voltage source, and first resistors connecting said supply source and each of said input electrodes, the time constant of the resistor-capacitor combinations determining a particular repetition rate for said multivibrator, means for changing the repetition rate of said multivibrator from said particular rate to a higher rate in accordance with a mark-space signal comprising an input point to which said signals are applied, second resistors having first and second terminals, said first terminals being connected to said supply source, a first pair of unilaterally conducting devices interconnecting said input point and the respective second terminals of each said second resistor and rendered conducting by a mark signal at said input point, a second pair of unilaterally conducting devices oppositely poled from said first pair respectively joining the second terminals of each said second resistor to the said input electrodes and rendered conducting by a space signal at said input point to place pairs of said first and second resistors effectively in parallel.

3. An astable multivibrator modulator comprising a pair of transistors, each having base emitter and collector electrodes, a two-terminal supply voltage source, a load resistor connecting each collector electrode to one terminal of said supply source, one collector electrode serving as the output point for said modulator, means directly connecting each emitter electrode to the other terminal of said supply source, a capacitor connecting the collector electrode of each of said transistors to the base electrode of the other of said transistors, a first resistor network connecting each base electrode to the one terminal of said supply source, a second resistor paralleling each said first resistor network and having one terminal connected to the one terminal of said supply source, a shunting diode connecting the other terminal of each said second resistor to a point on each said first resistor network remote from said supply source, each said diode being normally forward biased by said supply source to shunt said first resistor network at least partially by said second resistor, a binary encoded digital data source, and means under the control of said data source for reverse biasing each said diode for each binary quantity of one kind only.

4. The astable multivibrator modulator according to claim 3 in which said reverse biasing means comprises a steering diode connected between a common point and the other terminal of each said second resistor and poled oppositely to each said shunting diode, and a transistor switch interposed between said data source and said common point.

5. The astable multivibrator modulator according to claim 3 in which said reverse biasing means comprises a pair of control transistors, each having base, emitter, and collector electrodes, means for connecting said emitter electrodes to the other terminal of said supply voltage source, resistive means coupling said base electrodes to said data source, and means for connecting said collector electrodes to the respective junctions of said second resistors and said shunting diodes.

6. The astable multivibrator modulator in accordance with claim 3 and a positive-starting feedback circuit comprising a pair of transistors each having base, emitter and collector electrodes and connected in cascade, collector electrode of one transistor to base electrode of the other transistor, means connecting the base electrode of the one transistor to the collector electrode of one of the transistors in said modulator, means connecting each emitter electrode to the other terminal of said supply source, diode means normally reverse biased coupling the collector electrode of said other transistor to the base electrode of each transistor in said modulator, a capacitor connected between the collector electrode of said one transistor and the other terminal of said supply source, and a resistor connected between the one terminal of said supply source and the collector electrode of said one transistor.

7. In combination, an astable multivibrator having two stages, each stage having an input and an output circuit capacitively cross-coupled to the output and input circuits of the other stage and being normally in a conducting condition while the other stage is in a nonconducting condition, and means insuring that both multivibrator stages cannot simultaneously lock in the conducting condition comprising a feedback path between the output circuit of one multivibrator stage and the input circuit of both stages, said feedback path including a capacitor which charges responsive to prolonged conduction in said one multivibrator stage and switching means operative responsive to a charge on said capacitor to force at least one of the multivibrator stages into the nonconducting condition.

8. The combination of claim 7 in which said feedback path includes a switching device which closes responsive to the conducting condition in said one multivibrator stage and opens responsive to the nonconducting condition in said one multivibrator stage, a charging path for said capacitor rendered operative or non-operative according to the condition of said first switching device, said charging path when operative having a time constant substantially greater than the period of oscillation of said multivibrator, and a pair of diodes connecting said switching means to the input circuits of both multivibrator stages, said diodes being forward biased upon the closing of said switching means to remove saturating input current from said input circuits.

9. A frequency-shift modulator for binary digital data comprising a data source having a relatively positive output for "1" data bits and a relatively negative output for "0" data bits, a transistor switch connected to the output of said data source which closes its output electrode to ground reference responsive to positive input signals and remains open responsive to negative inputs, an astable transistor multivibrator having grounded emitter electrodes, input base electrodes and output collector electrodes, a capacitor cross-coupling each collector electrode to the opposite base electrode, a direct-current potential supply source having one terminal grounded and the other terminal connected to the collector electrodes of the transistors in said multivibrator, an input circuit for said multivibrator comprising a tapped resistor network interconnecting the other terminal of said supply source and each said base electrode, a pair of auxiliary resistors, each having one terminal connected to the other terminal of said supply source, first semiconductor diodes connected in the forward conducting direction from the other terminal of each of said auxiliary resistors to the taps on each of said resistor networks, second semiconductor diodes connected in the forward conducting direction from the other terminal of each of said auxiliary resistors to a common input point, and means for connecting said input point to the output electrode of said transistor switch whereby said second diodes are forward biased and said first diodes are back biased when said transistor switch closes its output electrode to ground, the time constant of the resistor network and said capacitors causing said multivibrator to oscillate at a relatively low frequency for "0" data bits and at a relatively high frequency for "1" data bits.

References Cited by the Examiner

UNITED STATES PATENTS

| | | | |
|---|---|---|---|
| 2,787,712 | 4/57 | Priebe et al. | 331—113 |
| 2,968,008 | 1/61 | Marenholtz | 331—113 |
| 3,067,336 | 12/62 | Eachus | 307—88.5 |

ROY LAKE, *Primary Examiner.*

ALFRED L. BRODY, *Examiner.*